(12) United States Patent
Elend et al.

(10) Patent No.: US 10,131,866 B2
(45) Date of Patent: Nov. 20, 2018

(54) MYCOTOXIN-BINDERS

(71) Applicants: Direvo Industrial Biotechnology GmbH, Köln (DE); BASF Enzymes, LLC, San Diego, CA (US)

(72) Inventors: Christian Elend, Köln (DE); Marco Krämer, Köln (DE)

(73) Assignees: Direvo Industrial Biotechnology GmbH, Cologne (DE); BASF Enzymes, LLC, San Diego, CA (US)

( * ) Notice: Subject to any disclaimer, the term of this patent is extended or adjusted under 35 U.S.C. 154(b) by 177 days.

(21) Appl. No.: 14/769,128

(22) PCT Filed: Mar. 20, 2013

(86) PCT No.: PCT/EP2013/055836
§ 371 (c)(1),
(2) Date: Aug. 20, 2015

(87) PCT Pub. No.: WO2014/127851
PCT Pub. Date: Aug. 28, 2014

(65) Prior Publication Data
US 2015/0376558 A1    Dec. 31, 2015

(30) Foreign Application Priority Data

Feb. 21, 2013 (EP) ..................... 13156259

(51) Int. Cl.
*C12H 1/00* (2006.01)
*A23K 10/38* (2016.01)

(52) U.S. Cl.
CPC ............. *C12H 1/003* (2013.01); *A23K 10/38* (2016.05); *Y02P 60/873* (2015.11)

(58) Field of Classification Search
CPC .................................................. C12H 1/003
USPC .......................................................... 426/12
See application file for complete search history.

(56) References Cited

U.S. PATENT DOCUMENTS

| 5,149,549 | A | 9/1992 | Beggs |
| 5,165,946 | A | 11/1992 | Taylor |
| 5,639,492 | A | 6/1997 | Turk |
| 2009/0226570 | A1* | 9/2009 | Viksoe-Nielsen ..... A23K 10/38 |
| | | | 426/53 |
| 2010/0189856 | A1 | 7/2010 | Tranquil |
| 2010/0189871 | A1 | 7/2010 | Yu |
| 2011/0150853 | A1 | 6/2011 | Mann |
| 2012/0082759 | A1 | 4/2012 | Theodore |

FOREIGN PATENT DOCUMENTS

| EP | 440304 | 8/1991 |
| JP | 61040792 | 2/1986 |
| JP | 03047076 | 2/1987 |
| JP | 6336775 | 2/1988 |
| JP | 63056289 | 3/1988 |
| JP | 08051975 | 2/1996 |
| JP | 2009234948 | 10/2009 |
| WO | 8701388 | 3/1987 |
| WO | 9118974 | 12/1991 |
| WO | 9203557 | 3/1992 |
| WO | 9216632 | 3/1992 |
| WO | 9711164 | 3/1997 |
| WO | 9953772 | 10/1999 |
| WO | 2008009673 | 1/2008 |
| WO | 2012084225 | 6/2012 |

OTHER PUBLICATIONS

Cheng, Y-H. et al. Anim. Res. 55: 579-590 (2006).*
Talbot, et al., Purification and characterization of thermostable beta-mannanase and alpha-galactosidase from Bacillus stearothermophilus , Appl Environ Microbiol, 54 (11):3505-10 (1990).

* cited by examiner

*Primary Examiner* — Hamid R Badr
(74) *Attorney, Agent, or Firm* — Wagenknecht IP Law Group PC

(57) ABSTRACT

The present technology relates to novel mycotoxin binder and the use in animal feed. The present disclosure relates also to the use of enzymes for improving the mycotoxin binding ability of by-products derived from a fermentative production process and to compositions comprising enzymes capable of degrading components in the fermented mash in the fermentation process.

13 Claims, 7 Drawing Sheets

MYCOTOXIN-BINDERS

CROSS-REFERENCE TO RELATED APPLICATIONS

This application is a 371 application of International Application No. PCT/EP2013/055836, filed Mar. 20, 2013, which claims benefit of European Application No. 13156259.7, filed Feb. 21, 2013.

FIELD OF THE INVENTION

The present disclosure relates to novel mycotoxin binder. The present disclosure relates also to the use of enzymes for improving the mycotoxin binding ability of by-products derived from a fermentative production process and to compositions comprising enzymes capable of degrading components in the fermented mash in the fermentation process.

BACKGROUND OF THE INVENTION

Mycotoxins are secondary metabolites secreted by a variety of fungi, often produced in cereal grains as well as forages before, during and after harvest. Forages and cereals naturally come into contact with fungal spores.

Some fungi produce toxins only at specific levels of moisture, temperature or oxygen. The effects of mycotoxins vary greatly in their severity. Some mycotoxins are lethal, some cause identifiable diseases or health problems, some weaken the immune system without producing symptoms specific to that mycotoxin, some act as allergens or irritants, and some have no known effect on animals or humans. According to recent United Nation's Food and Agriculture Organization (FAO) reports, approximately 25% of the world's grain supply is contaminated with mycotoxins. Mycotoxin contamination has a negative economic impact on food and feed producers, particularly grain and poultry producers.

Mycotoxin formation may occur when the causative fungi grow on crops in the field, at harvest, in storage, or during feed processing; essentially whenever favorable conditions for their formation prevail. Generalizations about geographical distribution of particular types of mycotoxins are difficult due to widespread distribution of the causative fungi. However, aflatoxins and fumonisin tend to prevail in warmer climates, while cooler regions with higher moisture are subject to ochratoxin, zearalenone, vomitoxin (deoxynivalenol, DON), T2 toxin, and others. Each mycotoxin has its own particular effect, and all can be devastating. Co-contamination by one or more types of mycotoxin occurs naturally, and exerts a greater negative impact on health and productivity of livestock than contamination by individual mycotoxins.

The physical effects of mycotoxins range from reduced feed intake and poor feed conversion to a general inability of an animal to thrive. Symptoms vary according to toxin. Vomitoxin, called the feed refusal factor, affects mainly pigs.

Zearalenone affects the reproductive organs of pigs and dairy cattle. Fumonisin causes a nervous disorder in horses due to its impact in the brain. Ochratoxin causes kidney damage. Poultry and pigs are sensitive to ochratoxin, whereas dairy cattle can tolerate higher levels of ochratoxin because of its biotransformation into a nontoxic form by ruminal bacteria. Aflatoxins, the most common mycotoxin, cause increased susceptibility to disease. At the organ or cellular level mycotoxins differ in their effects with severe damage done to the liver and kidney by aflatoxins and on reproductive organs by zearalenone. Other indices of mycotoxicosis include mammary gland swelling and ovarian atrophy (zearalenone), oral lesions in chicks (T2 toxins), nervous system disorders and necrosis of the extremities (ergot alkaloids). Mycotoxins may also impact human health, as many are transferred into milk or meat following ingestion by the animal. For example, aflatoxins appear in milk as aflatoxin M1, a metabolite.

Acute symptoms of mycotoxicosis are often relatively easy to identify. However, chronic symptoms including slightly diminished performance and/or immunosuppression may result in greater economic losses. Traditional methods of dealing with mycotoxins include use of mold inhibitors to prevent mold growth in stored feeds. However, particularly in the livestock industries, economic circumstances force producers to find ways to use mycotoxin-contaminated feeds.

Mycotoxins can appear in the food chain as a result of fungal infection of plant products like forage, grain, plant protein, roughage and molasses products and in processed grain by-products, and can either be eaten directly by humans, or introduced by contaminated grains, livestock or other animal feedstuff(s). Mycotoxins greatly resist decomposition during digestion so they remain in the food chain in edible products (e.g., meat, fish, eggs and dairy products) or under the form of metabolites of the parent toxin ingested.

Common methods have included dilution of contaminated feeds with feedstuffs known to be free of mycotoxins, physical separation to remove highly contaminated feeds, and ammoniation or heating to detoxify the feeds. These methods are labor-intensive and uneconomical, and may be ineffective against certain mycotoxins.

A more viable method of dealing with mycotoxin-contaminated feeds is to blend in substance capable of binding out the toxins, thus preventing absorption of the toxins into the animal's bloodstream. Few chemicals have proven successful enough to use commercially. Among these, use of mineral clays as binders has proven common. For example, U.S. Pat. No. 5,149,549 teaches the use of a montmorillonite clay, particularly a bentonite clay, admixed with animal feeds as a mycotoxin binder. U.S. Pat. No. 5,165,946 teaches the use of a montmorillonite clay in combination with a suitable sequestrant, particularly phosphate and polyphosphate salts, as a mycotoxin binder. U.S. Pat. No. 5,639,492 further refines the art, teaching the use of an acid-activated calcium bentonite clay admixed with animal feeds to reduce effects of mycotoxin contamination.

However, clays as mycotoxin binders have significant limitations. Clays must be included in animal feeds at high levels to effect significant mycotoxin binding.

Additionally, most clays have a limited binding efficacy range, binding only aflatoxins to any significant extent. Further, in domestic livestock production situations, excreted clays may cause problems with clogging of manure handling equipment. Thus, a need exists for a mycotoxin-binding agent, effective against a wide range of mycotoxins, which can be admixed with animal feeds at lower inclusion rates than is currently possible with substances commonly used to bind mycotoxins in feeds.

Therefore, it is an object of the present disclosure to provide novel mycotoxin binders and improved methods to produce mycotoxin binders for the use in animals.

SUMMARY OF THE DISCLOSURE

The present disclosure relates to the use of by-products derived from a fermentative production process, in particular from an ethanol fermentation process, for binding mycotoxins in an animal, wherein the by-product is selected from the group consisting of distillers' wet grain (DWG), distillers' dried grains (DDG), distillers' solubles (DS), distillers' dried solubles (DDS), distillers' dried grain with solubles (DDGS), and mixtures thereof.

In one aspect, the present disclosure pertains to methods for improving the mycotoxin binding ability of a by-product derived from a fermentative production process comprising the steps of: i) subjecting the fermented mash after the fermentation to an enzyme composition capable of degrading one or more fermented mash components, ii) separating the desired primary fermentation product, iii) separating the fermentation by-product having mycotoxin binding abilities.

In a further aspect, the present disclosure relates to methods of producing a mycotoxin binder comprising a fermentation by-product from starch-containing material in an ethanol production process, said method comprising the steps of:
  i) Converting starch containing material to fermentable sugars
  ii) Fermentation of the fermentable sugars with a yeast to fermented mash
  iii) Subjecting the fermented mash after the fermentation process to an enzyme composition comprising a beta-1,3-glucanase
  iv) Separation of the ethanol in the fermented mash by distillation
  v) Separation of the by-product.

Furthermore, aspects of the present disclosure relates to the use of an enzyme composition comprising a beta-1,3-glucanase for the improvement of the mycotoxin binding ability of a by-product derived from fermented mash in a fermentative ethanol production process.

A further aspect pertains to methods for producing a mycotoxin free by-product derived from a fermentative production process using starch-containing material contaminated with mycotoxins comprising the steps of: i) subjecting the fermented mash after the fermentation to an enzyme composition capable of degrading one or more mycotoxins, ii) separating the desired primary fermentation product, iii) separating the fermentation by-product having low content of mycotoxins.

In a further aspect, the present disclosure relates to methods of producing a mycotoxin binder comprising a fermentation by-product from starch containing material in a fermentation production process, said method comprising the steps of:
  i) Converting starch-containing material to fermentable sugars
  ii) Fermentation of the fermentable sugars with a yeast to fermented mash
  iii) Subjecting the fermented mash before or after the fermentation process to an enzyme composition comprising an enzyme capable of degrade present mycotoxins originating from the starch-containing material
  iv) Subjecting the fermented mash after the fermentation process to an enzyme composition comprising a beta-1,3-glucanase
  v) Separation of the primary fermentation product in the fermented mash
  vi) Separation of the by-product.

Furthermore, aspects of the present disclosure relates to the use of an enzyme composition comprising mycotoxin degrading capabilities to remove mycotoxins present in the starch-containing material and/or comprising a beta-1,3-glucanase for the improvement of the mycotoxin binding ability of a by-product derived from fermented mash in a fermentative ethanol production process.

DESCRIPTION OF THE INVENTION

Figure 1:
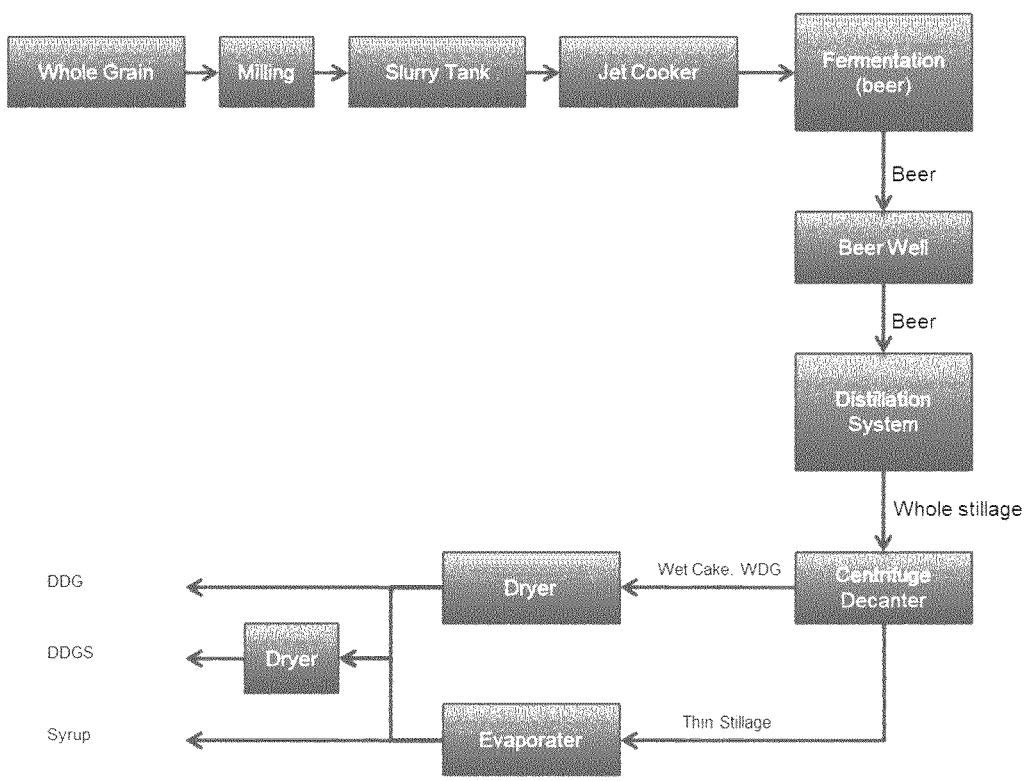
FIG. 1 schematically shows an ethanol production process.

The object of the present invention is to provide new products with improved quality and functionality of binding mycotoxins in animals.

A large number of mycotoxins have been identified. Currently, there are five main groups of particular agricultural interest: the Aflatoxins, the trichothenes (for example Deoxynivalenol), the Zearalenone group, the Fumonisins and the endophyte toxins.

Aflatoxins can cause growth reduction, suppressed immunity, reduced feed efficiency and increased mortality in cattle, among other symptoms. In pigs, reduced feed efficiency, increased mortality, and lower growth rates can be observed. In poultry, there are similar symptoms and a decreased ability to metabolize fat, protein and starch.

Zearalenone in cattle and pigs mimics oestrogen and produces a considerable reduction in reproductive performance, reduced growth, reduced milk production and reduced feed efficiency. In poultry, increased mortality is observed.

Deoxynivalenol (DON), an example of a trichothene, causes severe symptoms in cattle, pigs and poultry, including gastric effects such as vomiting, reduced growth rates, reduced egg production, scours and reduced feed efficiency.

Fumonisin produces negative effects via a reduction in blood circulation and cardiac output, at least in part by agonising sphingosine receptors. In this way they reduce growth and cause pulmonary oedema in swine and poultry. This reduction of circulation affects all major organs including the liver and can exacerbate and enhance the effects of other toxins that may also be present.

Ochratoxin can be carcinogenic in man and produces immuno-supression in farm animals. Lolitrem B (*Acremonium lolii* in Ryegrass) is an example of an endophyte toxin that produces a form of grass staggers often confused with hypomagnesaemia.

Surprisingly, the inventors found that by-products derived from a fermentation production process can be excellent used as mycotoxin binders in mammalians. In particular, the by-product distillers' dried grain with solubles (DDGS) from corn binds excellent mycotoxins due to their specific structure.

In an advantageous embodiment, the treatment of the fermented mash with an enzyme composition comprising beta 1,3 glucanase in an ethanol production process using yeast as the fermenting microorganism results in an by-product from the fermentation process with further improved mycotoxin binding abilities, which therefore can be used as an animal nutrition.

In an advantegeous embodiment the mycotoxin to be bound and/or tob e degrade is a tricothene like deoxynivalenol, or is Zearalenone, Aflatoxin, Fumonisin, Roquefortin, an ochratoxin or an endophyte toxin. In paricular, the mycotoxin is Zearalenone.

One aspect of the present disclosure relates to methods for the production of mycotoxin binding by-products derived from a fermentative production process comprising the steps of: i) subjecting the fermented mash after the fermentation to an enzyme composition capable of degrading one or more fermented mash components, ii) separating the desired primary fermentation product, iii) separating the fermentation by-product having mycotoxin binding abilities.

By-products or residues of a fermenting process include distillers' grain, brewer's grains, dried distiller's grains, dried distiller's solubles, distiller's dried grains with solubles, WDG or/and residues of the cereal processing industry, or mixtures thereof. For example, DDGS are the dried residue remaining after the starch fraction of corn is fermented with selected yeasts and enzymes to produce ethanol and carbon dioxide. After complete fermentation, the alcohol is removed by distillation and the remaining fermentation residues are dried.

In some advantageous embodiments, the by-product is selected from the group consisting of distillers' wet grain (DWG), distillers' dried grains (DDG), distillers' solubles (DS), distillers' dried solubles (DDS), distillers' dried grain with solubles (DDGS), and mixtures thereof. In particular, the by-product having mycotoxin binding abilities is DDGS.

Stillage is the product, which remains after the mash, has been converted to sugar, fermented and distilled into ethanol. Stillage can be separated into two fractions, such as, by centrifugation or screening: (1) wet cake (solid phase) and (2) the thin stillage (supernatant). The solid fraction or distillers' wet grain (DWG) can be pressed to remove excess moisture and then dried to produce distillers' dried grains (DDG). After ethanol has been removed from the liquid fraction, the remaining liquid can be evaporated to concentrate the soluble material into condensed distillers' solubles (DS) or dried and ground to create distillers' dried solubles (DDS). DDS is often mixed with DDG to form distillers' dried grain with solubles (DDGS). DDG, DDGS, and DWG are collectively referred to as distillers' grain(s).

In one embodiment of the present disclosure enzymes were added during and/or preferably after the fermentation in the production process to the fermented mash and before the separation step of the primary fermentation product, in particular by distillation, where the desired fermentation main product is separated from the rest of the fermented mash. The enzymes according to the present disclosure were capable of degrading in particular yeast cells in the fermented mash (beer or beer mash) which improves the mycotoxin binding ability the of by-products or residues like brewer's grains, dried distiller's grains, dried distiller's solubles, distiller's dried grains with solubles, WDG or/and residues of the cereal processing industry, or mixtures thereof in view of their mycotoxin content. Components of the fermented mash can be in particular the cell-walls of the fermenting yeast cells.

Surprisingly, the degradation of the fermenting yeast cells itself by adding an enzyme composition comprising a beta 1,3 glucanase and/or an esterase and/or an epoxidase, results also in a decrease of the mycotoxin content in the beer mash itself which results in an improvement of the nutrition quality and functionality of the byproducts.

In an advantageous embodiment, the enzyme compositions used in the methods according to the present disclosure are capable to degrade the cell wall components of the fermenting yeast cells after the fermentation step, which results in binding one or more mycotoxins in the fermentation by-product.

Therefore, the disclosure pertains also to methods for producing a mycotoxin free by-product derived from a fermentative production process using starch-containing material contaminated with mycotoxins comprising the steps of: i) subjecting the fermented mash after the fermentation to an enzyme composition capable of degrading one or more mycotoxins, ii) separating the desired primary fermentation product, iii) separating the fermentation by-product having low content of mycotoxins.

In one aspect of the present disclosure, the quality of by-products from a fermentative production process like DDG, DDGS or WDG can be improved with the methods according to the present disclosure by increasing the β-glucan content and therefore the mycotoxin-binding capacities of the by-products.

The method of the disclosure may be used on beer derived from production of any suitable fermentation product. The feedstock for producing the fermentation product may be any starch- and/or sugar containing material, preferably starch- and/or sugar containing plant material, including: sugar cane, tubers, roots, whole grain; and any combination thereof.

The starch-containing material may be obtained from cereals. Suitable starch-containing material includes corn (maize), wheat, barley, cassava, sorghum, rye, triticale, potato, or any combination thereof.

Corn is the preferred feedstock, especially when the fermentation product is ethanol. The starch-containing material may also consist of or comprise, e.g., a side stream from starch processing, e.g., C6 carbohydrate containing process streams that may not be suited for production of syrups. Beer components include fiber, hull, germ, oil and protein components from the starch-containing feedstock as well as non-fermented starch, yeasts, yeast cell walls and residuals. Production of a fermentation product is typically divided into the following main process stages: a) Reducing the particle size of starch-containing material, e.g., by dry or wet milling; b) Cooking the starch-containing material in aqueous slurry to gelatinize the starch, c) Liquefying the gelatinized starch-containing material in order to break down the starch (by hydrolysis) into maltodextrins (dextrins); d) Saccharifying the maltodextrins (dextrins) to produce low molecular sugars (e.g., DP1-2) that can be metabolized by a fermenting organism; e) Fermenting the saccharified material using a suitable fermenting organism directly or indirectly converting low molecular sugars into the desired fermentation product; f) Recovering the fermentation product, e.g., by distillation in order to separate the fermentation product from the fermentation mash.

As also explained above beer (or fermented mash) is the fermentation product consisting of ethanol, other liquids and solids of a desired fermentation product. According to the invention the primary fermentation product may be any fermentation product, including alcohols (e.g., ethanol, methanol, butanol, 1,3-propanediol); organic acids (e.g., citric acid, acetic acid, itaconic acid, lactic acid, gluconic acid, gluconate, succinic acid, 2,5-diketo-D-gluconic acid); ketones (e.g., acetone); amino acids (e.g., glutamic acid);

gases (e.g., $H_2$ and $CO_2$), and more complex compounds, including, for example, antibiotics (e.g., penicillin and tetracycline); enzymes; vitamins (e.g., riboflavin, B12, beta-carotene); and hormones. Fermentation is also commonly used in the production of consumable alcohol (e.g., spirits, beer and wine), dairy (e.g., in the production of yogurt and cheese), leather, and tobacco industries. In a preferred embodiment the fermentation product is a liquid, preferably an alcohol, especially ethanol. The beer contemplated according to the invention may be the product resulting from a fermentation product production process including above-mentioned steps a) to f). However, the beer may also be the product resulting from other fermentation product production processes based on starch- and/or lignocellulose containing starting material.

The fermenting organism may be a fungal organism, such as yeast, or bacteria. Suitable bacteria may e.g. be *Zymomonas* species, such as *Zymomonas mobilis* and *E. coli*. Examples of filamentous fungi include strains of *Penicillium* species. Preferred organisms for ethanol production are yeasts, such as e.g. *Pichia* or *Saccharomyces*. Preferred yeasts according to the disclosure are *Saccharomyces* species, in particular *Saccharomyces cerevisiae* or baker's yeast.

In a further embodiment, the solids from the fermentation step can be fractionated. After fermentation large pieces of fibers could be removed prior or after distillation. Removal can be effected with a surface skimmer before to distillation of beer. The material can be separated from the ethanol/water mix by, e.g. centrifugation. Alternatively, fibers and germs can be removed by screening the whole stillage after distillation or the grinded grains before fermentation. After germs and large pieces of fibers are removed the remaining beer or whole stillage are treated with enzymes or enzyme combinations to further improve the nutritional quality of the final byproduct like DDGS to be used.

Further, by adding the enzymes according to the present disclosure to the fermented mash before the separation step, like a distillation step is an advantage since the enzymes in the enzyme compositions are inactivated during the distillation.

Due to the improved quality, the by-products and residues can be used as high quality animal feed with an increased ability to bind mycotoxin in animals and/or the by-products itself shows a lower mycotoxin content if the starch-containing material used as a feedstock for the fermentation was contaminated with mycotoxins.

In one embodiment, the disclosure relates to methods for formulating nutritionally useful feed additives as co-products of the above-referenced methods for improving mycotoxin-binding characteristics of an animal feed product.

Processes for producing fermentation products, such as ethanol, from a starch or lignocellulose containing material are well known in the art. The preparation of the starch-containing material such as corn for utilization in such fermentation processes typically begins with grinding the corn in a dry-grind or wet-milling process. Wet-milling processes involve fractionating the corn into different components where only the starch fraction enters into the fermentation process. Dry-grind processes involve grinding the corn kernels into meal and mixing the meal with water and enzymes. Generally two different kinds of dry-grind processes are used. The most commonly used process, often referred to as a "conventional process," includes grinding the starch-containing material and then liquefying gelatinized starch at a high temperature using typically a bacterial alpha-amylase, followed by simultaneous saccharification and fermentation (SSF) carried out in the presence of a glucoamylase and a fermentation organism. Another well-known process, often referred to as a "raw starch hydrolysis" process (RSH process), includes grinding the starch-containing material and then simultaneously saccharifying and fermenting granular starch below the initial gelatinization temperature typically in the presence of an acid fungal alpha-amylase and a glucoamylase.

In a process for producing ethanol from corn, following SSF or the RSH process the ethanol is distilled from the whole mash after fermentation. The resulting ethanol-free slurry, usually referred to as whole stillage, is separated into solid and liquid fractions (i.e., wet cake and thin stillage containing about 35 and 7% solids, respectively). The thin stillage is often condensed by evaporation into a thick stillage or syrup and recombined with the wet cake and further dried into distillers' dried grains with solubles distillers' dried grain with solubles (DDGS) for use in animal feed.

The method of the invention may be used on beer derived from production of any suitable fermentation product. The feedstock for producing the fermentation product may be any starch- and/or sugar containing material, preferably starch- and/or sugar containing plant material, including: sugar cane, tubers, roots, whole grain; and any combination thereof.

The starch-containing material may be obtained from cereals. Suitable starch-containing material includes corn (maize), wheat, barley, cassava, sorghum, rye, triticale, potato, or any combination thereof.

In advantageous embodiment, the enzyme compositions comprise a beta-1,3-glucanase, in particular for the degradation of the cell walls from the fermenting microorganisms. To avoid the degradation of the fermentative microorganisms the enzyme composition is added after the fermentation step. As used herein "after the fermentation" or "after the fermentation step" means that a large part or all of the fermentable sugars like glucose are converted to the desired fermentation products such as ethanol.

In an embodiment, the enzyme composition comprises a beta-1,3-glucanase and a 1,6-beta-glucanase. In another embodiment, the enzyme composition comprises a protease. In an another embodiment, the enzyme composition comprises a beta-1,3-glucanase and a protease. In another embodiment, the enzyme composition comprises a beta-1,3-glucanase, a 1,6-beta-glucanase and a protease.

In a further embodiment, enzyme composition comprises a mannanase. In a further embodiment the enzyme composition comprises a mannanase and a beta-1,3-glucanase.

Another embodiments pertains to methods for producing a mycotoxin free by-product derived from a fermentative production process using starch-containing material contaminated with mycotoxins comprising the steps of: i) subjecting the fermented mash after the fermentation to an enzyme composition capable of degrading one or more mycotoxins, ii) separating the desired primary fermentation product, iii) separating the fermentation by-product having low content of mycotoxins.

In advantageous embodiments, the enzyme composition comprises an esterase and/or an epoxidase. In further embodiments, the enzyme composition comprises further a beta-1,3-glucanase.

Beta-1,3-glucanases as used herein are enzymes capable of degrading of glucan. Glucan and chitin are far more resistant to microbial degradation than cellulose, which is the major constituent of the cell wall of many yeasts and fungi-like organisms. Glucan is predominantly beta-1,3- linked with some branching via 1,6-linkage (Manners et al., Biotechnol. Bioeng, 38, p. 977, 1973), and is known to be degradable by certain beta-1,3-glucanase systems. beta-1,3-glucanase includes the group of endo-beta-1,3-glucanases also called laminarinases (E.C. 3.2.1.39 and E.C. 3.2.1.6, Enzyme Nomenclature, Academic Press, Inc. 1992).

A number of beta-1,3-glucanase genes and uses thereof have been disclosed in the prior art. An example is DD 226012 (Akad. Wissenshaft, DDR) which concerns a method for production of a *Bacillus* beta-1,3-glucanase. Further, JP 61040792 A (DOI K) describes a cell wall-cytolase beta-1,3-glucanase recombinant plasmid for removing the cell walls of yeast. The gene is derived from *Arthrobacter* and is transformed in *Escherichia* group bacteria. EP 440.304 concerns plants provided with improved resistance against pathogenic fungi transformed with at least one gene encoding an intracellular chitinase, or in intra- or extracellular beta-1,3-glucanase. The matching recombinant polynucleotides is also disclosed. WO 87/01388 (The Trustees of Columbia University) describes a method for preparing cell lytic enzymes, such as beta-1,3-glucanases, which can be produced by Oerksovia. WO 92/03557 (Majesty (Her) in Right of Canada) discloses a recombinant DNA expression vector comprising a 2.7 kb DNA sequence, derived from Oerskovia xanthineolytica, encoding a beta-1, 3-glucanase. From WO 92/16632 a recombinant DNA sequence coding for a novel protein with beta-1,3-glucanase activity, is known.

Examples for commercial available beta-1,3-glucanase are Rohalase BX from AB Enzymes and Rapidase Glucalees from DSM.

Mannanases are hemicellulases classified as EC 3.2.1.78, and called endo-1,4-beta-mannosidase. Mannanase includes beta-mannanase, endo-1,4-mannanase, and galacto-mannanase. Mannanase is preferably capable of catalyzing the hydrolysis of 1,4-beta-D-mannosidic linkages in mannans, including glucomannans, galactomannans and galactoglucomannans. Mannans are polysaccharides primarily or entirely composed of D-mannose units. The mannanase may be of any origin such as a bacterium or a fungal organism. In a specific embodiment the mannanase is derived from a strain of the filamentous fungus genus *Trichoderma*, preferably *Trichoderma reseei*. In an embodiment the mannanase is one of the mannanases described in WO2008/009673.

Mannanases have been identified in several *Bacillus* organisms. For example, Talbot et al., Appl. Environ. Microbiol., Vol. 56, No. 11, pp. 3505-3510 (1990) describes a beta-mannanase derived from *Bacillus stearothermophilus*. Mendoza et al., World J. Microbiol. Biotech., Vol. 10, No. 5, pp. 551-555 (1994) describes a beta-mannanase derived from *Bacillus subtilis*. JP-A-03047076 discloses a beta-mannanase derived from *Bacillus* sp. JP-A-63056289 describes the production of an alkaline, thermo stable beta-mannanase. JP-A-63036775 relates to the *Bacillus* microorganism FERM P-8856 which produces beta-mannanase and beta-mannosidase. JP-A-08051975 discloses alkaline beta-mannanases from alkalophilic *Bacillus* sp. AM-001. A purified mannanase from *Bacillus amyloliquefaciens* is disclosed in WO 97/11164. WO 91/18974 describes a hemicellulase such as a glucanase, xylanase or mannanase active. Examples of commercially available mannanases include GAMANASE™ available from Novozymes A/S Denmark and Rohapect GMP™ available from AB Enzymes GmbH.

Mannanase may be added in an amount effective in the range from $0.3 \times 10^6$-$1.6 \times 10^6$ Units per ton beer mash.

Proteases as used in the present disclosure are enzymes that catalyze the cleavage of peptide bonds. Suitable proteases include fungal and bacterial proteases. Preferred proteases are acidic proteases, i.e., proteases characterized by the ability to hydrolyze proteins under acidic conditions below pH 7

Suitable acid fungal proteases include fungal proteases derived from *Aspergillus, Mucor, Rhizopus, Candida, Coriolus, Endothia, Enthomophtra, Irpex, Penicillium, Sclerotium* and *Toru-lopsis*. Commercial proteases include GC 106™ and SPEZYME™ FAN (available from Genencor, USA). Suitable bacterial proteases, although not acidic proteases, include the commercially available products ALCALASE™ and NEUTRASE™ (available from Novozymes A/S).

Protease may be added in an amount effective in the range from $0.002 \times 10^6$-$314 \times 10^6$ Units per ton beer mash.

In a further aspect, the present disclosure relates to methods of producing a mycotoxin binder comprising a fermentation by-product from starch containing material in a fermentation production process, said method comprising the steps of:
i) Converting starch containing material to fermentable sugars
ii) Fermentation of the fermentable sugars with a yeast to fermented mash
iii) Subjecting the fermented mash after the fermentation process to an enzyme composition comprising a beta-1,3-glucanase
iv) Separation of the primary fermentation product in the fermented mash
v) Separation of the by-product.

In a further aspect, the present disclosure relates to methods of producing a mycotoxin binder comprising a fermentation by-product from starch containing material in a fermentation production process, said method comprising the steps of:
i) Converting starch containing material to fermentable sugars
ii) Fermentation of the fermentable sugars with a yeast to fermented mash
iii) Subjecting the fermented mash after the fermentation to an enzyme composition capable of degrading one or more mycotoxins,
iv) Subjecting the fermented mash after the fermentation process to an enzyme composition comprising a beta-1,3-glucanase
v) Separation of the primary fermentation product in the fermented mash
vi) Separation of the by-product.

Converting starch-containing material to fermentable sugars can be done by (a) liquefying a starch-containing material and (b) saccharifying the liquefied material obtained in step (a).

In an advantageous embodiment, the enzyme composition capable of degrading one or more mycotoxins comprises an enzyme selected from the group consisting of an esterase, lipase, protease, oxidase, amino acid oxidase, lactonohydrolase, peroxidase, lactoperoxidase, manganese peroxidase, epoxidase, polysaccharase or dehydrogenase. In particular, the enzyme composition comprises a lipase and/or an epoxidase.

The liquefaction is preferably carried out in the presence of an alpha-amylase, preferably a bacterial alpha-amylase or acid fungal alpha-amylase. In an embodiment, a pullulanase, isoamylase, and and/or phytase is added during liquefaction.

Preferred organisms for ethanol production are yeasts, such as e. g. *Pichia* or *Saccharomyces*. Preferred yeast according to the disclosure is *Saccharomyces* species, in particular *Saccharomyces cerevisiae* or baker's yeast. The yeast cells may be added in amounts of $10^5$ to $10^{12}$, preferably from $10^7$ to $10^{10}$, especially $5 \times 10^7$ viable yeast count per ml of fermentation broth. During the ethanol producing phase the yeast cell count should preferably be in the range from $10^7$ to $10^{10}$, especially around $2 \times 10^8$. Further guidance in respect of using yeast for fermentation can be found in, e. g., "The alcohol Textbook" (Editors K. Jacques, T. P. Lyons and D. R. Kelsall, Nottingham University Press, United Kingdom 1999), which is hereby incorporated by reference The microorganism used for the fermentation is added to the mash and the fermentation is ongoing until the desired amount of fermentation product is produced; in a preferred embodiment wherein the fermentation product is ethanol to be recovered this may, e. g. be for 24-96 hours, such as 35-60 hours. The temperature and pH during fermentation is at a temperature and pH suitable for the microorganism in question and with regard to the intended use of the fermentation product, such as, e.g., in an embodiment wherein the fermenting organism is yeast and the product is ethanol for recovery the preferred temperature is in the range about 26-34 C, e. g. about 32 C, and at a pH e. g. in the range about pH 3-6, e. g. about pH 4-5.

In another embodiment wherein the fermenting organism is yeast, and the fermented mash is to be used as a beer, the preferred temperature of the fermented mash is around 10 to 35° C., in particular 12-16 C, in particular 14 C.

As mentioned above, the fermenting organism is preferably yeast, e.g., a strain of *Saccharomyces cerevisiae* or *Saccharomyces diastaticus*. In an avantageous embodiment a yeast strain of *Saccharomyces diastaticus* is used (SIHA Amyloferm®, E. Begerow GmbH&Co, Langenlonsheim, Germany) since their exo-amylase activity can split liquid starch and also dextrin, maltose and melibiose.

In the liquefaction step the gelatinized starch (downstream mash) is broken down (hydrolyzed) into maltodextrins (dextrins). To achieve starch hydrolysis a suitable enzyme, preferably an alpha-amylase, is added. Liquefaction may be carried out as a three-step hot slurry process. The slurry is heated to between 60-95° C., preferably 80-85° C., and an alpha-amylase may be added to initiate liquefaction (thinning). Then the slurry may be jet-cooked at a temperature between 95-140° C., preferably 105-125° C., for about 1-15 minutes, preferably for about 3-10 minutes, especially around about 5 minutes. The slurry is cooled to 60-95° C. and more alpha-amylase may be added to complete the hydrolysis (secondary liquefaction). The liquefaction process is usually carried out at a pH of 4.0 to 6.5, in particular at a pH of 4.5 to 6.

The saccharification step and the fermentation step may be performed as separate process steps or as a simultaneous saccharification and fermentation (SSF) step. The saccharification is carried out in the presence of a saccharifying enzyme, e. g. a glucoamylase, a beta-amylase or maltogenic amylase. Optionally a phytase and/or a protease is added.

Saccharification may be carried out using conditions well known in the art with a saccharifying enzyme, e.g., beta-amylase, glucoamylase or maltogenic amylase, and optionally a debranching enzyme, such as an isoamylase or a pullulanase. For instance, a full saccharification process may last up to from about 24 to about 72 hours, however, it is common to do a pre-saccharification for typically 40-90 minutes at a temperature between 30-65° C., typically about 60° C., followed by complete saccharification during fermentation in a simultaneous saccharification and fermentation process (SSF process). Saccharification is typically carried out at a temperature from 20-75° C., preferably from 40-70° C., typically around 60° C., and at a pH between 4 and 5, normally at about pH 4.5.

The most widely used process to produce a fermentation product, especially ethanol, is the simultaneous saccharification and fermentation (SSF) process, in which there is no holding stage for the saccharification, meaning that a fermenting organism, such as a yeast, and enzyme(s), including the hemicellulase(s) and/or specific endoglucanase(s), may be added together. SSF is typically carried out at a temperature from 25° C. to 40° C., such as from 28° C. to 35° C., from 30° C. to 34° C., preferably around about 32° C. In an embodiment, fermentation is ongoing for 6 to 120 hours, in particular 24 to 96 hours.

After the fermentation, the fermented mash is subjected to an enzyme composition according to the present disclosure. In an advantageous embodiment, the enzyme composition comprises a beta-1,3-glucanase. In another embodiment the enzyme composition comprises a beta-1,3-glucanase and a 1,6-beta-glucanase. In another embodiment, the enzyme composition comprises a xylanase. In an advantageous embodiment, the enzyme composition comprises a beta-1,3-glucanase and a xylanase. In another embodiment, the enzyme composition comprises a beta-1,3-glucanase, a 1,6-beta-glucanase and a xylanase. In further embodiments, the enzyme composition comprises in addition a pectinase and/or a protease. In an example the enzyme composition comprises a beta-1,3-glucanase, a xylanase and a protease. In another example the enzyme composition comprises a beta-1,3-glucanase, a xylanase and a pectinase. In a further embodiment, enzyme composition comprises a mannanase. In an advantageous embodiment the enzyme composition comprises a mannanase and a beta-1,3-glucanase.

In a particular embodiment, the process of the invention further comprises, prior to liquefying the starch-containing material the steps of:
  reducing the particle size of the starch-containing material, preferably by milling; and
  forming a slurry comprising the starch-containing material and water.

The aqueous slurry may contain from 10-55 w/w % dry solids (DS), preferably 25-45 w/w % dry solids (DS), more preferably 30-40 w/w % dry solids (DS) of the starch-containing material. The slurry is heated to above the gelatinization temperature and an alpha-amylase, preferably a bacterial and/or acid fungal alpha-amylase, may be added to initiate liquefaction (thinning). The slurry may be jet-cooked to further gelatinize the slurry before being subjected to an alpha-amylase in step (a).

In a preferred embodiment, the starch containing material is milled cereals, preferably barley or corn, and the methods comprise a step of milling the cereals before step (a). In other words, the disclosure also encompasses methods, wherein the starch containing material is obtainable by a process comprising milling of cereals, preferably dry milling, e. g. by hammer or roller mils. Grinding is also understood as milling, as is any process suitable for opening the individual grains and exposing the endosperm for further processing. Two processes of milling are normally used in alcohol production: wet and dry milling. The term "dry milling" denotes milling of the whole grain. In dry milling the whole kernel is milled and used in the remaining part of the process Mash formation. The mash may be provided by forming a slurry comprising the milled starch containing material and brewing water. The brewing water may be heated to a suitable temperature prior to being combined with the milled starch containing material in order to achieve a mash temperature of 45 to 70° C., preferably of 53 to 66° C., more preferably of 55 to 60° C. The mash is typically formed in a tank known as the slurry tank.

Subsequent to fermentation the fermentation product may be separated from the fermentation medium. The slurry may be distilled to extract the desired fermentation product or the desired fermentation product from the fermentation medium by micro or membrane filtration techniques. Alternatively the fermentation product may be recovered by stripping. Methods for recovering fermentation products are well known in the art. Typically, the fermentation product, e.g., ethanol, with a purity of up to, e.g., about 96 vol. % ethanol is obtained.

Following the completion of the fermentation process, the material remaining is considered the whole stillage. As used herein, the term "whole stillage" includes the material that remains at the end of the fermentation process both before and after recovery of the fermentation product, e.g., ethanol. The fermentation product can optionally be recovered by any method known in the art. In one embodiment, the whole stillage is separated or partitioned into a solid and liquid phase by one or more methods for separating the thin stillage from the wet cake. Such methods include, for example, centrifugation and decanting. The fermentation product can be optionally recovered before or after the whole stillage is separated into a solid and liquid phase.

Thus, in one embodiment, the methods of the disclosure further comprise distillation to obtain the fermentation product, e.g., ethanol. The fermentation and the distillation may be carried out simultaneously and/or separately/sequentially; optionally followed by one or more process steps for further refinement of the fermentation product.

Figure 2:
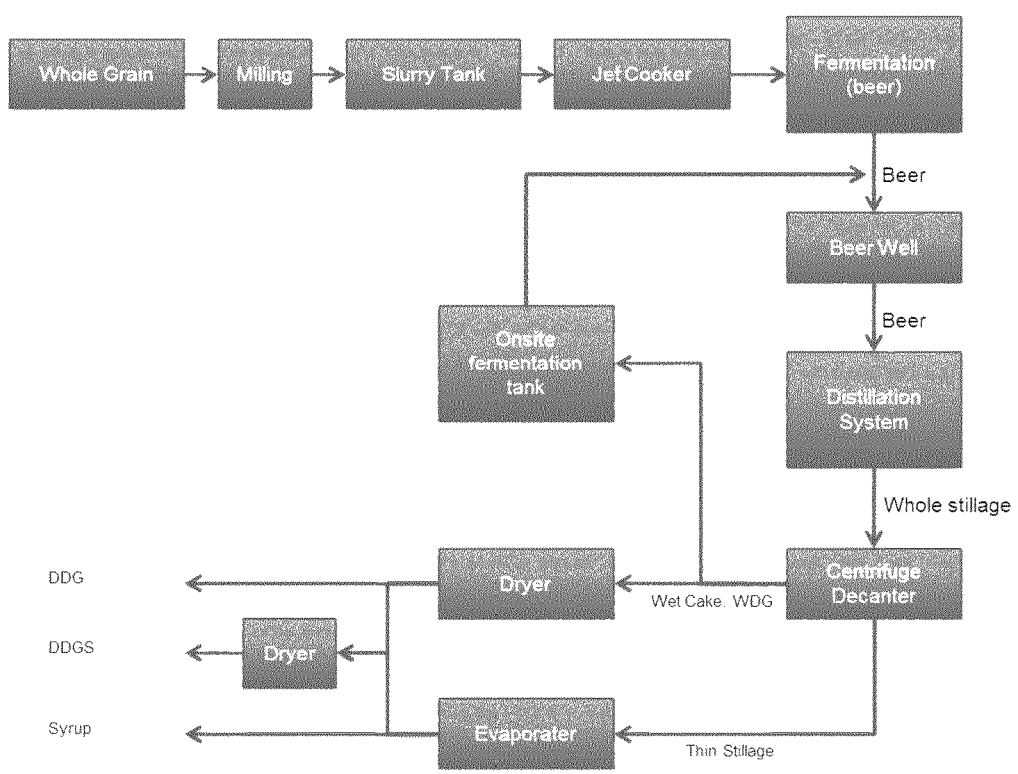
FIG. 2 schematically shows an ethanol process including on site fermentation tank for enzyme production based on WDG.
Figure 3:
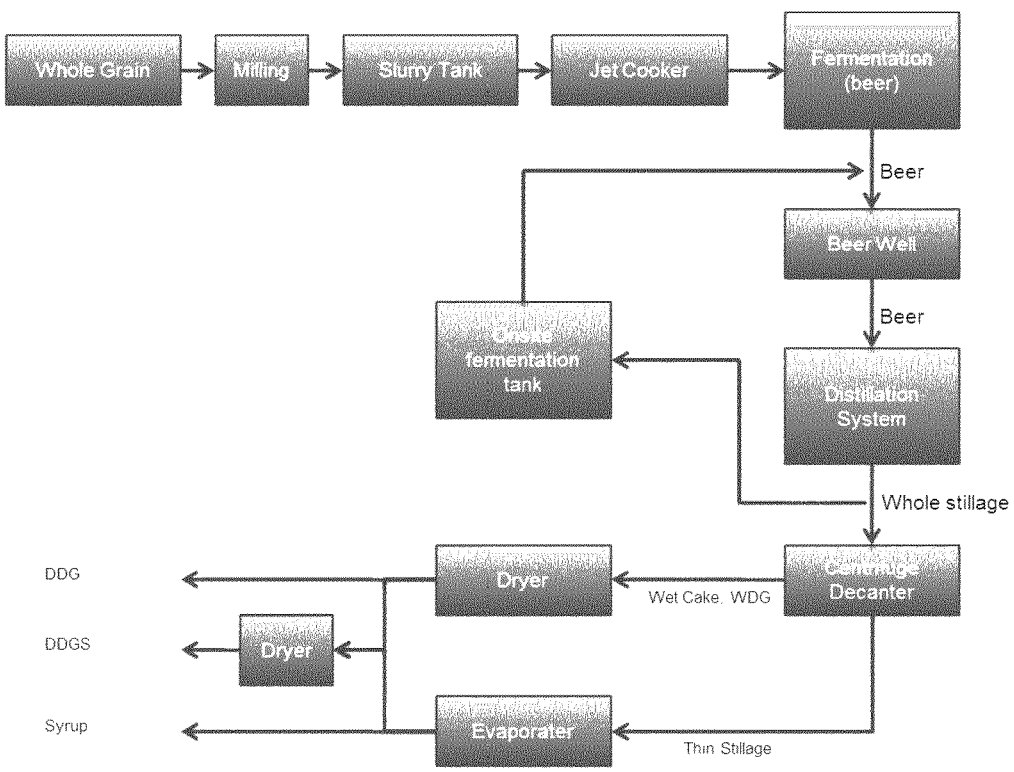
FIG. 3 schematically shows an ethanol process including on site fermentation tank for enzyme production based on whole stillage.

In an embodiment, the aqueous by-product (whole stillage) from the distillation process is separated into two fractions, e.g., by centrifugation: wet grain (solid phase), and thin stillage (supernatant). In another embodiment, the methods of the disclosure further comprise separation of the whole stillage produced by distillation into wet grain and thin stillage; and recycling thin stillage to the starch containing material prior to liquefaction. In one embodiment, the thin stillage is recycled to the milled whole grain slurry. The wet grain fraction may be dried, typically in a drum dryer. The dried product is referred to as distillers dried grains, and can be used as mentioned above as high quality animal feed. The thin stillage fraction may be evaporated providing two fractions (see FIG. 1 and FIG. 2), (i) a condensate fraction of 4-6% DS (mainly of starch, proteins, and cell wall components), and (ii) a syrup fraction, mainly consisting of limit dextrins and non-fermentable sugars, which may be introduced into a dryer together with the wet grains (from the whole stillage separation step) to provide a product referred to as distillers dried grain with solubles, which also can be used as animal feed. Thin stillage is the term used for the supernatant of the centrifugation of the whole stillage. Typically, the thin stillage contains 4-6% DS (mainly starch and proteins) and has a temperature of about 60-90° C. In another embodiment, the thin stillage is not recycled, but the condensate stream of evaporated thin stillage is recycled to the slurry containing the milled whole grain to be jet cooked.

Further details on how to carry out liquefaction, saccharification, fermentation, distillation, and recovering of ethanol are well known to the skilled person.

The fermentation product(s) can be optionally recovered from the fermentation medium using any method known in the art including, but not limited to, chromatography, electrophoretic procedures, differential solubility, distillation, or extraction. For example, alcohol is separated from the fermented cellulosic material and purified by conventional methods of distillation as mentioned above. Ethanol with a purity of up to about 96 vol. % can be obtained, which can be used as, for example, fuel ethanol, drinking ethanol, i.e., potable neutral spirits, or industrial ethanol.

The inventions described and claimed herein are not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. In the case of conflict, the present disclosure including definitions will control. Various references are cited herein, the disclosures of which are incorporated by reference in their entireties. The present invention is further described by the following examples, which should not be construed as limiting the scope of the invention.

EXAMPLES

Example 1

Brewer's yeast cells that are traditionally used in ethanol fermentations contain large amounts of β-glucans in their cell walls. These β-glucans should be hydrolysed by the use of enzymes and the resulting fragmented β-glucans are tested for their ability to bind mycotoxins by removing them from a mycotoxin-containing solution.

In later applications, the brewing yeast, which is an ingredient in fermented mash from the ethanol fermentation, should be hydrolysed within the process to create distillers dried grains with mycotoxin binding properties.

1.1 Enzymes:

The following enzymes listed in Table 1 were used alone or in different combinations.

TABLE 1

| Typ | Shortname | Main Activity | Unit |
|---|---|---|---|
| β1-4 glucanase | Glu1 | 10016.97 | U/g |
| β1-4 glucanase | Glu2 | 10594.57 | U/g |
| β1-4 glucanase | Glu3 | 3583.18 | U/g |
| β1-3 glucanase | Glu5 | 763.00 | U/ml |
| β1-3 glucanase | Glu4 | 891.00 | U/g |
| β1-4 glucanase, hemicellulase | Glu9 | 2588.00 | U/ml |
| xylanase, β1-4 glucanase | Tre7 | | |

1.2 Enzyme Product Activity Determination:

Substrates: Glucanase: β-Glucan from barley, low viscosity (Megazyme)

Substrates were dissolved in buffer to a concentration of 0.8% (w/v)

Buffer: 50 mM NaAcetat, pH 4.5

The Enzymes were diluted in buffer; the right enzyme concentration must be determined for each enzyme. A 90 µl substrate and 10 µl enzyme solution were mixed. A blank was measured replacing enzyme solution with water. Inkubation for 30 min at 37° C. (followed from 10 min at 4° C.). Reducing sugars were measured after mixing of 50 µl of the incubated substrate—enzyme mix with 50 µl DNSA-Reagent.

The activity is calculated as Units per µl or mg of enzyme product. 1 unit is defined as the amount of formed reducing ends in µmol per minute. One protease unit is defined as the formation of glycin equivalents per minute.

1.3 Hydrolysis of Yeast Cells

For the preparation of yeast β-glucans, 20% (w/v) yeast (*Saccharomyces cerevisiae* yeast powder, Ohly, Hamburg, Germany) solution in 50 mM Na-acetate buffer, pH 4.5, was used. Samples of 45 ml were filled in 50 ml Falcon tubes and treated as follows:

- enzyme stock solutions of 100 mg/ml in buffer (50 mM Na-acetate, pH 4.5) were prepared.
- 360 µl enzyme solution were added to the yeast cell solution and mixed thoroughly.
- the samples were incubated for 18 h at 37° C. and 150 rpm shaking horizontally
- blank samples were prepared with adding 360 µl buffer instead of enzyme
- 1.5 ml samples were taken for analysis directly after addition of enzymes and kept at −20° C. until further analysis
- after 18 h incubation, the samples were pelleted (4000 rpm, 4° C., 15 min) and the supernatants were analyzed for β-glucan content.

1.4 Analysis of Beta-Glucans

Analysis of beta-glucans was carried out with the Yeast beta Glucan Kit K-EBHLG from Megazyme, but one fourth of the described volume in the instructions was used. The analysis was based on the specific enzymatic digestion of (1-3)(1-6)-beta-glucans to glucose. Controls carried out without enzymatic digestion of glucans provide the background concentrations of glucose, which have to be subtracted from the samples.

Enzymatic Digestion of Beta-Glucans

200 µL 1.2 M Na acetate was added to a 50 µL sample, which had been pipetted into an Eppendorf tube. Samples were treated with 5 µL Glucazyme™ an enzyme mixture containing beta-glucanase, beta-glucosidase and chitinase, then stirred by a plastic spatula and subsequently kept for 16 h at 40° C. in an incubator. Glucazyme™ was left out in controls and 5 µL of distilled water was added instead.

Analysis of Glucose Monomers Derived from Beta-Glucans

25 µL both from the digestion samples and controls was added to 1000 µL GOPOD reagent (containing buffer adjusted to pH 7.4, glucose oxidase, peroxidase and 4-aminoantipyrine p-hydroxybenzoic acid) previously adjusted to 40° C. in a water bath in a photometer cuvette (Rotilabo®-disposable cuvettes, polystirol). The cuvettes were incubated at 40° C. for 30 minutes and the optical density at 510 nm was determined against air in the light path.

1.5 Binding of Zearalenone

A stock solution of the mycotoxin Zearalenone (Sigma Aldrich, Taufkirchen, Germany) was prepared 1 mg/ml in acetonitrile. Working dilutions were further diluted in acetonitrile to a concentration of 1.04 ppm (parts per million).

Reaction samples were prepared as follows:
- 200 µl enzyme treated yeast solution
- 64.6 µl zearalenone working stock
- (final concentration 33.6 ppb (parts per billion))
- as 2000 µl d H2O Samples were incubated 2 h at 37° C. with horizontal shaking (150 rpm). Following incubation the samples were centrifuged (15 min, 5000×g, room temperature) and the supernatant was used for analysis as described in the following section.

1.6 Determination of Mycotoxinconcentrations

For the determination of mycotoxin concentrations, commercial kits were used (RIDASCREEN® Zearalenon (Article R1401), R-Biopharm AG, Darmstadt, Germany) with slight modifications as described below.

150 µl supernatant were mixed with 350 µl methanol to reach a mixture of methanol:water of 70:30. Then the samples were analyzed according to the manufacturers instruction as follows:

The methanolic supernatant was diluted 1:7 (1+6) with sample dilution buffer (buffer 1, 100 µl supernatant+600 µl buffer 1)

All reagents are brought to room temperature (20-25° C.) before use. The zearalenone enzyme conjugate is provided as a concentrate. Since the diluted enzyme conjugate has a limited stability, only the amount which actually is needed should be reconstituted. Before pipetting, the enzyme conjugate should be shaken carefully. For reconstitution, the concentrate is diluted 1:11 (1+10) in buffer 1 e.g. 200 µl concentrate+2.0 ml buffer, sufficient for 4 microtiter strips).

The recommended washing procedure had to be followed carefully, the microwells are not allowed to dry between working steps.

1. A sufficient number of microtiter wells had been inserted into the microwell holder for all standards and samples to be run in duplicate.

2. 50 µl of the standard solutions or prepared sample were added to separate duplicate wells.

3. 50 µl of the diluted enzyme conjugate were added to each well and gently mixed by shaking the plate manually. The plate was incubate for 2 h at room temperature (20-25° C.) in the dark.

4. The liquid was poured out of the wells and the microwell holder tapped upside down vigorously (three times in a row) against absorbent paper to ensure complete removal of liquid from the wells. All the wells were filled with 250 µl distilled water and the liquid poured out again. This washing procedure was repeated two times.

5. 50 µl of substrate and 50 µl of chromogen were added to each well. The plate was then mixed manually by shaking and incubated for 30 min at room temperature (20-25° C.) in the dark.

6. 100 µl of the stop solution were added to each well. The plate was then mixed manually by shaking and the absorbance measured at 450 nm within 30 minutes after addition of stop solution.

Zearalenone concentrations were determined by comparison with the standards supplied with the kit.

1.7 Results

Figure 4:
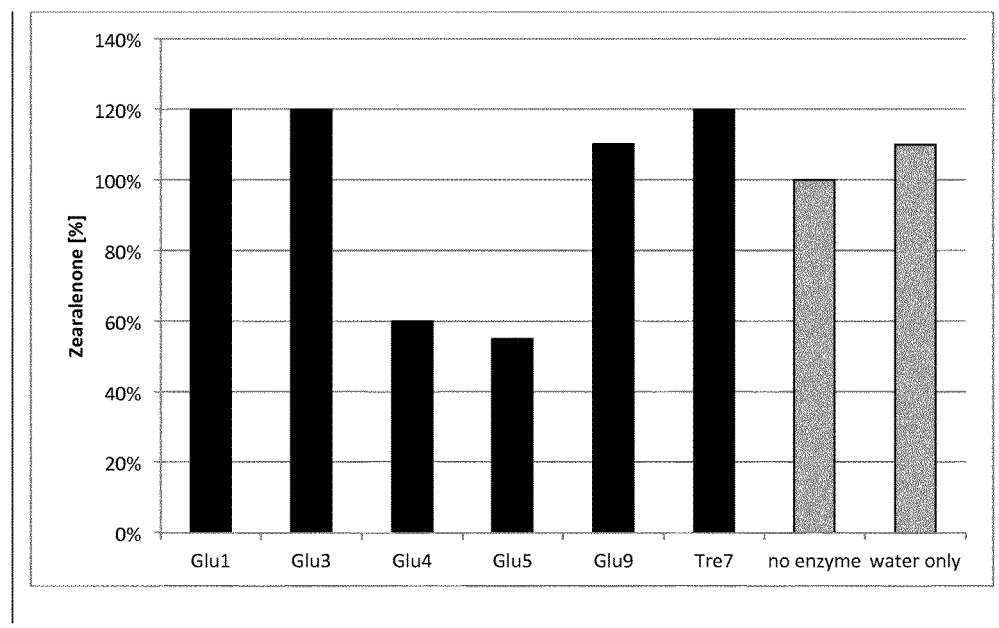
FIG. 4 is a diagram showing increased binding of zearalenone by enzymatically treated yeast cell supernatants.
Figure 5:
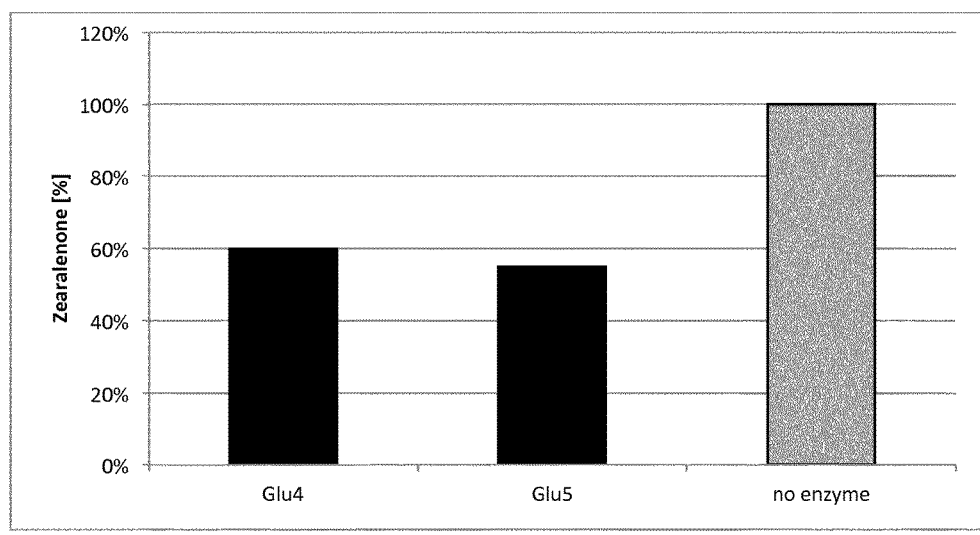
FIG. 5 is a diagram showing increased binding of zearalenone by yeast cell supernatants treated with Glu4 and Glu5.

Only the enzymes Glu4 and Glu5 produced β-glucan containing supernatants from the yeast cells, that reduced the amount of zearalenone to 54.9% and 60.1% (table 2) of the untreated yeast cells as shown in FIG. 4 and FIG. 5. Therefore, they clearly have potential to release β-glucans with mycotoxinbind effects from yeast cells in DDGS and thereby generate a DDGS with mycotoxinbinding potential.

TABLE 2

| Enzyme | % of blank |
| --- | --- |
| Glu4 | 54.9% |
| Glu5 | 60.1% |
| no enzyme | 100% |

Example 2

Distillers dried grains (DDGS) as a by-product from a ethanol fermentation process, contains lots of residual yeast cells from the ethanol fermentation process should be tested for their ability to bind mycotoxins. As yeast cell walls contain mainly β-1,3-glucans DDGS should be tested against other yeast products and pure β-glucans for their mycotoxinbinding capabilities.

2.1 Fermentation of Corn to Ethanol

In one embodiment, the process of the production of ethanol form corn was performed as follows:

a) reducing the particle size of the starch-containing material by milling:
   corn was milled to <2 mm particle size
b) forming a slurry comprising the starch-containing material and water
   10 kg corn were tap water at 35° C. to obtain a ~31.25% solid solution, total volume 30 liter
   pH range was 5.6-6.0
c) liquefying of the starch-containing material
   temperature was increased to 90° C.
   7 ml alpha-amylase (Novozymes Liquozyme SC) were added
   1% o antifoam was added (30 ml)
   incubation for 90 min at 90° C. and 150 rpm
   slurry was cooled to 30° C., pH adjusted to ~4 with 1 $NH_2SO_4$
d) saccharifying of the liquefied material obtained
   12 ml Glucoamylase (Novozymes Spirizyme Ultra) was added
e) fermentation
   Yeast propagation: 200 ml YNB-starch medium was incubated overnight (30° C., 150 rpm) and inoculated with 2 g yeast (SIHA Amyloferm), the complete pre-culture was added to the fermentation
   addition of 300 ppm ((NH4)2SO4) (10 g) as nitrogen source
   yeast addition
   pH was titrated to 4.0 with ammoniac solution (25%), supplies further nitrogen
   incubation for max. 48 h at 30° C. and 100 rpm
   2-ml samples were taken every 12 hrs to monitor fermentation progress (sugar-, ethanol concentration)

2.2 Binding of Zearalenone

Zearalenone (Sigma Aldrich, Taufkirchen, Germany) stock solution was prepared 1 mg/ml in acetonitrile. Working dilutions were further diluted in acetonitrile to a concentration of 1.04 ppm (parts per million).

Reaction samples were prepared as follows:
   10 mg DDGS or yeast product or β-glucan
   64.6 µl zearalenone working stock
     (final concentration 33.6 ppb (parts per billion))
   as 2000 µl $dH_2O$ Samples were incubated 2 h at 37° C. with horizontal shaking (150 rpm). Following incubation the samples were centrifuged (15 min, 5000×g, room temperature) and the supernatant was used for analysis as described in the following section.

2.3 Determination of Mycotoxinconcentrations

Determination of zearalenone concentration was done as described above. Zearalenone concentrations were determined by comparison with the standards supplied with the kit.

2.4 Results

Figure 6:
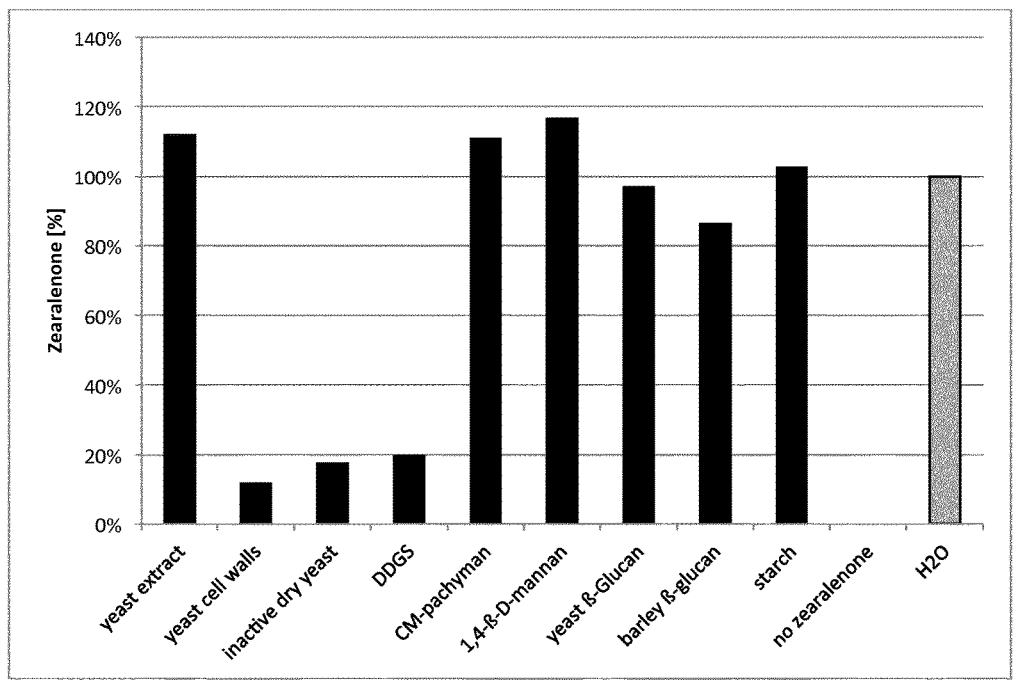
FIG. 6 is a diagram showing the capacities of binding zearalenone by DDGS, yeast cells and other glucans.

Addition of different β-glucans (pachyman, yeast β-glucan, barley β-glucan) did not affect zearalenone concentration as the negative controls (1,4-β-D-mannan, starch) did. Even pure, untreated yeast β-glucan did not affect zearalenone binding. The addition of DDGS, yeast cell walls and yeast powder reduced zearalenone concentrations to 20%, 12%, and 17%, respectively, as shown in FIG. 6 and Table 3.

TABLE 3

| Substance | Supplier | residual zearalenone - % of blank |
|---|---|---|
| yeast extract | Ohly | 112% |
| yeast cell walls | Ohly | 12% |
| inactive dry yeast | Ohly | 17% |
| DDGS | Direvo | 20% |
| CM-pachyman (β-1,3-glucan from Poria cocos) | Megazyme | 111% |
| 1,4-β-D-mannan | Megazyme | 117% |
| yeast β-Glucan | Megazyme | 97% |
| barley β-glucan | Megazyme | 86% |
| starch | Megazyme | 103% |
| no zearalenone | | 0% |
| H2O - blank | | 100% |

Figure 7:
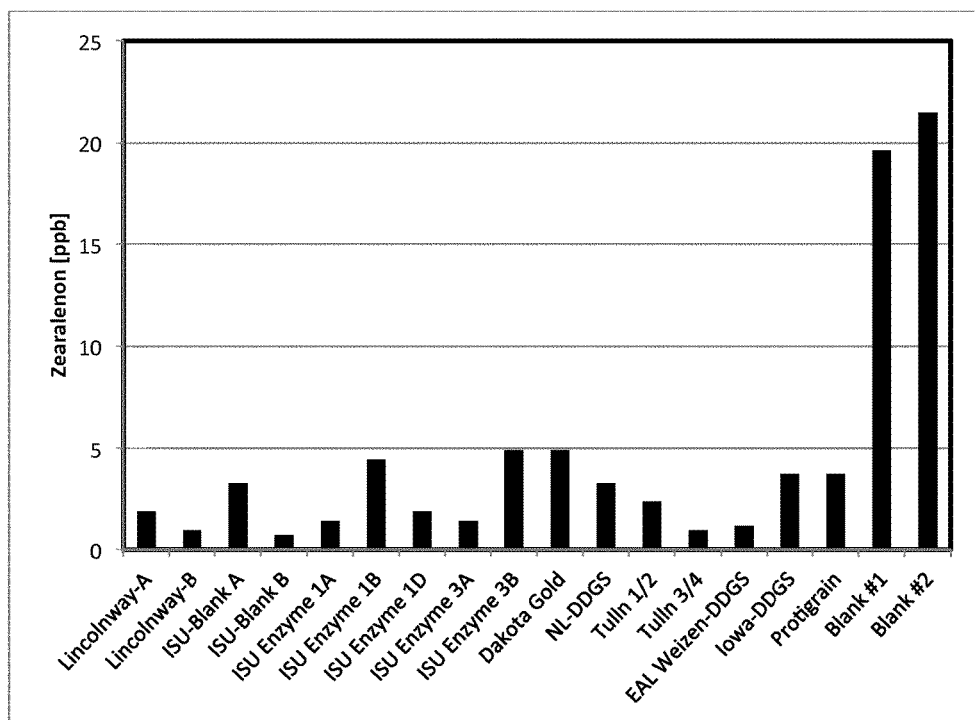
FIG. 7 is a diagram showing the capacities of binding zearalenone by different DDGS products.

Furthermore, the results in FIG. 7 show the positive mycotoxin binding ability of different DDGS products.

The invention claimed is:

1. A method for improving the mycotoxin binding ability of a by-product derived from a fermentative production process comprising the steps of:
   i) subjecting fermented mash after fermentation to an enzyme composition capable of degrading one or more fermented mash components;
   ii) separating a desired primary fermentation product;
   iii) separating the fermentation by-product having mycotoxin binding abilities; and
   iv) testing the mycotoxin binding abilities of the by-product.

2. The method according to claim 1, wherein the enzyme composition comprises a beta-1,3-glucanase.

3. The method according to claim 1, wherein the fermented mash is derived from a fermentative alcohol production process and the desired primary fermentation product is an alcohol.

4. The method according to claim 1, wherein the fermented mash is derived from starch-containing material selected from the group consisting of corn, wheat, barley, triticale, cassava, sorghum, rye, potato, and a combination thereof.

5. The method according to claim 4, wherein the desired primary fermentation product is separated by distillation.

6. The method according to claim 1, wherein the by-product is selected from the group consisting of distillers' wet grain (DWG), distillers' dried grains (DDG), distillers' solubles (DS), distillers' dried solubles (DDS), distillers' dried grain with solubles (DDGS), and mixtures thereof.

7. A method for producing a mycotoxin free by-product derived from a fermentative production process using starch-containing material contaminated with mycotoxins comprising the steps of:
   i) subjecting fermented mash after fermentation to an enzyme composition capable of degrading one or more mycotoxins, wherein the enzyme composition comprises an esterase, an epoxidase, or both;
   ii) separating a desired primary fermentation product; and
   iii) separating a fermentation by-product having low content of mycotoxins.

8. The method according to claim 7, wherein the enzyme composition comprises a beta-1,3-glucanase.

9. The method according to claim 7, wherein the fermented mash is derived from a fermentative alcohol production process and the desired primary fermentation product is an alcohol.

10. The method of claim 9, wherein the alcohol is ethanol.

11. The method according to claim 7, wherein the desired primary fermentation product is separated by distillation.

12. The method according to claim 7, wherein the starch-containing material is selected from the group consisting of corn, wheat, barley, triticale, cassava, sorghum, rye, potato, and a combination thereof.

13. The method according to claim 7, wherein by-product is selected from the group consisting of distillers' wet grain (DWG), distillers' dried grains (DDG), distillers' solubles (DS), distillers' dried solubles (DDS), distillers' dried grain with solubles (DDGS), and mixtures thereof.

* * * * *